United States Patent
Jin et al.

(10) Patent No.: US 9,820,275 B2
(45) Date of Patent: Nov. 14, 2017

(54) PROACTIVE UPSTREAM SCHEDULING FOR FLOWS IN A POINT-TO-MULTIPOINT COMMUNICATIONS NETWORK

(71) Applicant: CISCO TECHNOLOGY, INC., San Jose, CA (US)

(72) Inventors: Hang Jin, Plano, TX (US); John T. Chapman, Coto de Caza, CA (US); Gerard White, Nashua, NH (US); Alon Bernstein, Monte Sereno, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/130,629

(22) Filed: Apr. 15, 2016

(65) Prior Publication Data

US 2017/0303273 A1   Oct. 19, 2017

(51) Int. Cl.
*H04K 1/10* (2006.01)
*G01R 31/08* (2006.01)
(Continued)

(52) U.S. Cl.
CPC ......... *H04W 72/0446* (2013.01); *H04L 67/16* (2013.01); *H04W 72/1263* (2013.01); *H04W 72/14* (2013.01)

(58) Field of Classification Search
CPC ... H04L 12/1859; H04L 51/32; H04L 51/046; H04L 67/16; H04L 51/00; H04L 65/4076;
(Continued)

(56) References Cited

U.S. PATENT DOCUMENTS 6,282,208 B1 * 8/2001 Bowcutt ................. H04L 29/06
                                                              370/235
6,452,923 B1 * 9/2002 Gerszberg .......... H04N 21/2143
                                                              370/352
(Continued)

FOREIGN PATENT DOCUMENTS

EP           1195953 A1      4/2002

OTHER PUBLICATIONS

European Extended Search Report dated Sep. 15, 2017 cited in Application No. 17165885.9, 7 pgs.
(Continued)

*Primary Examiner* — Daniel Washburn
*Assistant Examiner* — Sarah Hassan
(74) *Attorney, Agent, or Firm* — Merchant & Gould P.C.

(57) ABSTRACT

A method is provided in one example embodiment and includes predicting a user average data rate for a cable modem; establishing a minimum bandwidth grant size and a maximum bandwidth grant size for the cable modem based on the predicted user average data rate; receiving from the cable modem a request for a particular amount of bandwidth; performing an overgrant if the particular amount of bandwidth is less than the minimum bandwidth grant size, in which the overgrant comprises granting to the cable modem more than the requested particular amount of bandwidth; and performing an undergrant if the particular amount of bandwidth is greater than the maximum bandwidth grant size, in which the undergrant comprises granting to the cable modem less than the requested particular amount of bandwidth.

17 Claims, 10 Drawing Sheets

(51) Int. Cl.
*H04W 72/04* (2009.01)
*H04W 72/12* (2009.01)
*H04W 72/14* (2009.01)
*H04L 29/08* (2006.01)

(58) Field of Classification Search
CPC ..... H04L 12/18; H04L 29/08; H04L 5/1438; H04L 43/0858; H04L 65/00
USPC .......................................... 375/260; 370/230
See application file for complete search history.

(56) References Cited

U.S. PATENT DOCUMENTS

| | | | |
|---|---|---|---|
| 6,466,592 B1* | 10/2002 | Chapman | H04N 21/235 370/537 |
| 6,741,551 B1* | 5/2004 | Cherubini | H04L 5/1438 370/210 |
| 7,088,678 B1* | 8/2006 | Freed | H04L 47/10 370/230 |
| 7,421,499 B1 | 9/2008 | Lanahan et al. | |
| 2002/0126699 A1 | 9/2002 | Cloonan et al. | |
| 2002/0162122 A1* | 10/2002 | Birks | H04N 7/088 725/136 |
| 2003/0016692 A1* | 1/2003 | Thomas | H04J 14/0282 370/442 |
| 2004/0068751 A1* | 4/2004 | Basawapatna | H04N 7/10 725/117 |
| 2006/0120282 A1* | 6/2006 | Carlson | H04L 12/2602 370/229 |
| 2007/0104226 A1* | 5/2007 | Versteeg | H04N 7/17309 370/485 |
| 2008/0037578 A1 | 2/2008 | Carlson et al. | |
| 2009/0028192 A1* | 1/2009 | Rieger | H04H 20/42 370/535 |
| 2009/0207731 A1 | 8/2009 | Carlson et al. | |
| 2009/0213871 A1 | 8/2009 | Carlson et al. | |
| 2014/0010269 A1* | 1/2014 | Ling | H04B 3/00 375/222 |
| 2015/0295838 A1 | 10/2015 | Liu et al. | |

OTHER PUBLICATIONS

I-Shyan Hwang et al., "A novel early DBA mechanism with prediction-based fair excessive bandwidth allocation scheme in EPON," Computer Communications, Elsevier Science Publishers BV, Amsterdam, Netherlands, vol. 31, No. 9, Jun. 8, 2008, pp. 1814-1823.

* cited by examiner

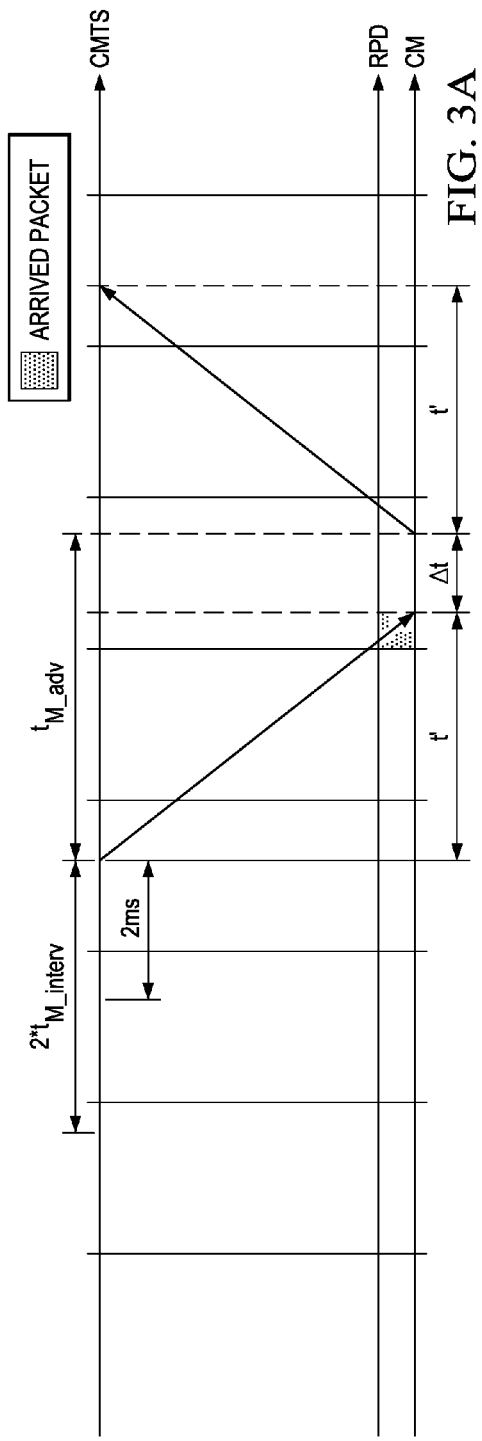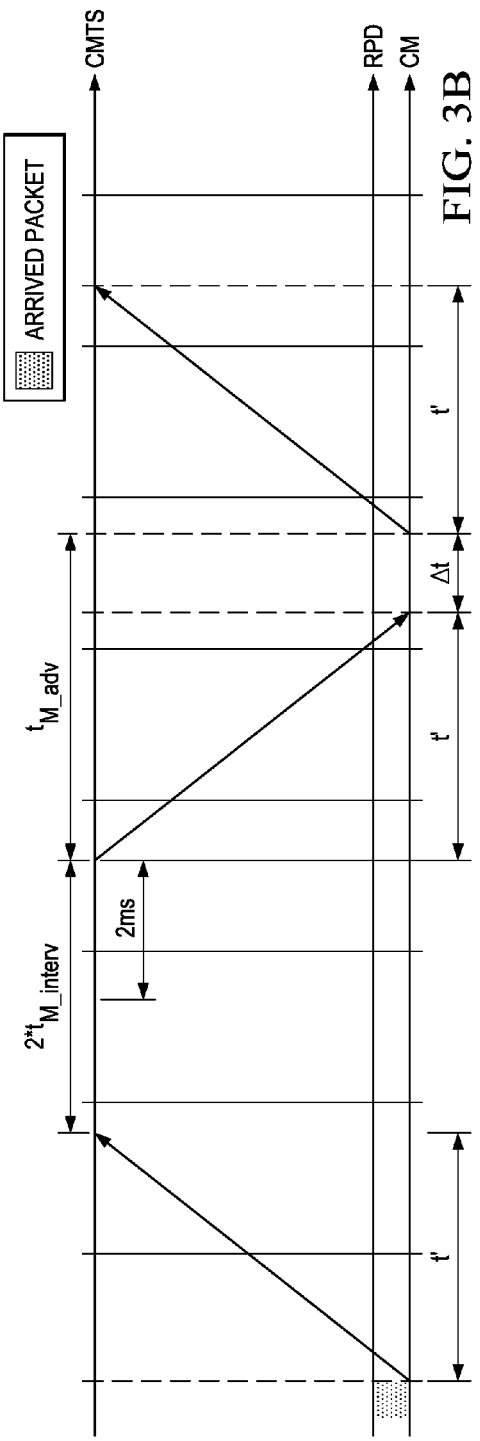

PROACTIVE UPSTREAM SCHEDULING FOR FLOWS IN A POINT-TO-MULTIPOINT COMMUNICATIONS NETWORK

TECHNICAL FIELD

This disclosure relates in general to the field of network communications and, more particularly, to embodiments for implementing proactive upstream scheduling for flows in a point-to-multipoint communications network.

BACKGROUND

Data over Cable Service Interface Specification ("DOCSIS") is an international telecommunications standard that enables implementation of high-speed data transfer over an existing cable TV ("CATV") network. DOCSIS may be employed by cable operators to provide Internet access over their existing hybrid fiber-coaxial ("HFC") infrastructure and may provide a variety of options available at Open Systems Interconnection ("OSI") layers 1 and 2, i.e., the physical layer and data link layer.

DOCSIS has enabled cable operators to widely deploy high-speed data services on CATV systems. Such data services allow subscriber-side devices, such as personal computers and the like, to communicate over an ordinary CATV network. A Cable Modem Termination System ("CMTS"), which in some embodiments may be implemented within a Converged Cable Access Platform ("CCAP"), connects the CATV network to a wide area network ("WAN"), such as the Internet. DOCSIS specifies that cable modems ("CMs") obtain upstream bandwidth according to a request-grant scheme. A cable modem sends a bandwidth allocation request to the CMTS when subscriber devices need to send traffic upstream into the cable network. The CMTS grants these requests using bandwidth allocation MAP messages to allocate a transmission timeslot to a particular service flow. As with any system that serves consumers, optimizing speed, latency, processing time, synchronization, etc., presents a significant challenge to system designers, network architects, and engineers alike.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 3A illustrates a concept of minimum delay in connection with techniques for performing proactive upstream scheduling for flows in a point-to-multipoint communications network may be implemented;

FIG. 3B illustrates a concept of maximum delay in connection with techniques for performing proactive upstream scheduling for flows in a point-to-multipoint communications network may be implemented;

DETAILED DESCRIPTION OF EXAMPLE EMBODIMENTS

Overview

Figure 1:
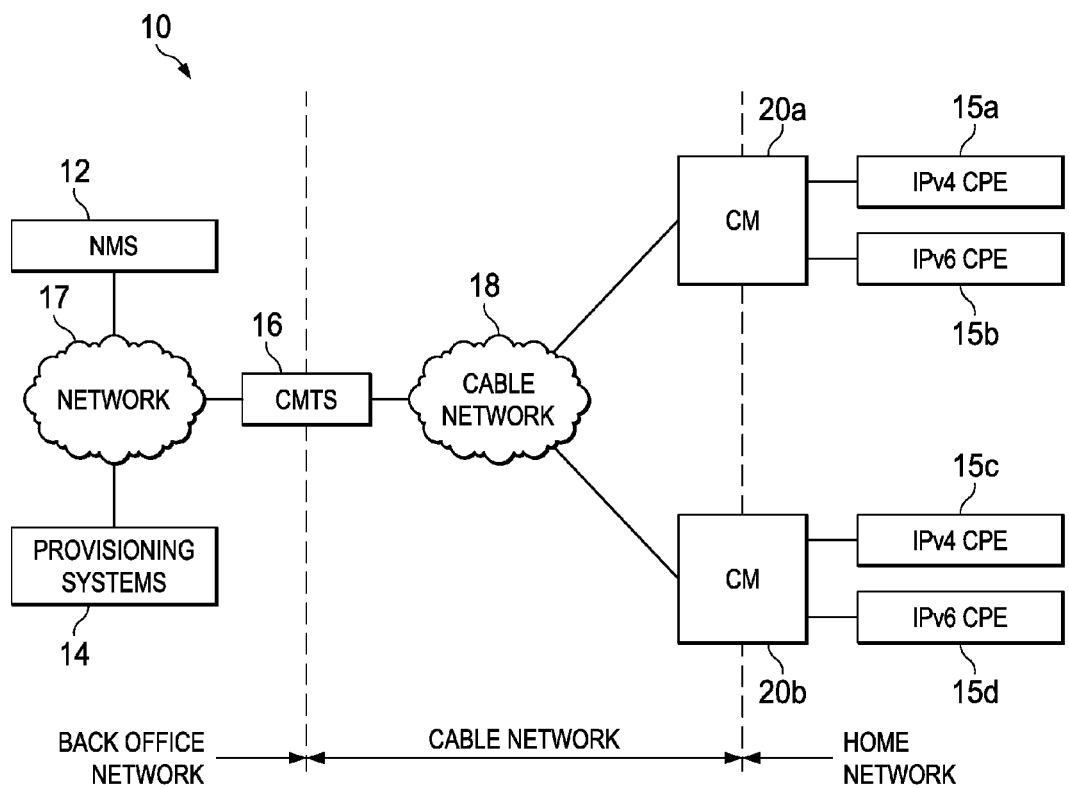
FIG. 1 is a simplified block diagram of a communications network in which techniques for performing proactive upstream scheduling for flows in a point-to-multipoint communications network may be implemented.

A method is provided in one example embodiment and includes predicting a user average data rate for a cable modem; establishing a minimum bandwidth grant size and a maximum bandwidth grant size for the cable modem based on the predicted user average data rate; receiving from the cable modem a request for a particular amount of bandwidth; performing an overgrant if the particular amount of bandwidth is less than the minimum bandwidth grant size, in which the overgrant comprises granting to the cable modem more than the requested particular amount of bandwidth; and performing an undergrant if the particular amount of bandwidth is greater than the maximum bandwidth grant size, in which the undergrant comprises granting to the cable modem less than the requested particular amount of bandwidth.

Example Embodiments

In a DOCSIS network, the CMTS controls the timing and rate of all upstream transmissions that cable modems make. Many different kinds of services with different latency, jitter, and throughput requirements run simultaneously on a modern DOCSIS network. A conventional DOCSIS-compliant CMTS can provide different upstream scheduling modes for different packet streams or applications through the concept of a "service flow." A service flow represents either an upstream or a downstream flow of data uniquely identified by a service flow ID ("SFID"). Each service flow may have its own quality of service ("QoS") parameters, for example, maximum throughput, minimum guaranteed throughput, and priority. In the case of upstream service flows, a scheduling mode may also be specified.

More than one upstream service flow may exist for each cable modem to accommodate different types of applications. For examples, web-based and email applications may use one service flow, voice-over-IP ("VoIP") applications may use another service flow, and online gaming may use yet another service flow. The characteristics of the service flows will differ based on the type of service required by the respective application. The CMTS and each cable modem are capable of directing the various types of traffic to the appropriate service flow through use of classifiers, which are special filters that match packet properties such as UDP and TCP port numbers to identify the appropriate service flow through which to transport packets.

Service flows are established and activated when a cable modem first comes online. The details of the service flows should be configured in a DOCSIS configuration file used to configure the cable modem; at least one service flow should be configured for the upstream traffic and at least one additional service flow should be configured for the downstream traffic. The first upstream and downstream service flows specified in the DOCSIS configuration file are referred to as the "primary service flows." Service flows may also be dynamically created and activated after a cable modem comes online. This scenario generally applies to a service flow that corresponds to VoIP telephone call data, which is created and activated when a telephone conversation begins and subsequently deactivated and deleted when the call ends.

When a cable modem has data to transmit on behalf of an upstream best effort service flow, the modem cannot simply forward the data onto the DOCSIS network with no delay; rather, the cable modem must request exclusive upstream transmission time from the CMTS. This request process ensures that the data does not collide with the transmissions of another cable modem connected to the same upstream channel. In some situations, the CMTS will schedule certain time periods during which the CMTS allows cable modems to transmit using special messages called "bandwidth requests." A bandwidth request is a very small frame that contains details of the amount of data the cable modem wants to transmit, plus a service identifier ("SID") that corresponds to the upstream service flow that needs to transmit the data. The CMTS maintains an internal table matching SID numbers to upstream service flows.

In alternative (e.g., non-DOCSIS) environments, the scheduler can schedule resources other than time. For example, in S-CDMA, the scheduler may schedule different codes to different cable modems, while in OFDM, the scheduler may schedule different frequencies to different cable modems. Regardless of the specific embodiment or environment, the general function of the scheduler is to allocate a portion of resources to a network element from a pool of shared resources.

In conventional operation, the scheduler schedules bandwidth request opportunities when no other events are scheduled in the upstream. In other words, the scheduler provides bandwidth request opportunities when the upstream scheduler has not planned for a best effort grant, UGS grant, or some other type of grant to be placed at a particular point. Therefore, when an upstream channel is heavily utilized, fewer opportunities exist for cable modems to transmit bandwidth requests. The scheduler may ensure that a small number of bandwidth request opportunities are regularly scheduled, no matter how congested the upstream channel becomes. It is possible that multiple cable modems may transmit bandwidth requests simultaneously, thereby corrupting each other's transmissions. In order to reduce (if not totally eliminate) the potential for collisions that can corrupt bandwidth requests, a "backoff and retry" algorithm is used. In brief, the backoff and retry algorithm requires that a cable modem that decides to transmit a bandwidth request must first wait for a random number of bandwidth request opportunities to pass before the modem makes the transmission. This wait time helps reduce the possibility of collisions that occur due to simultaneous transmissions of bandwidth requests.

In a conventional system, when the CMTS receives a bandwidth request from a cable modem, the CMTS may perform the following actions. First, the CMTS uses the SID number received in the bandwidth request to examine the service flow with which the bandwidth request is associated. Next, the CMTS uses a token bucket algorithm to check whether the service flow will exceed the prescribed maximum sustained rate if the CMTS grants the requested bandwidth. The token bucket algorithm may be executed using the equation Max(T)=T*(R/8)+B, where T represents time in seconds, Max(T) indicates the maximum number of bytes that can be transmitted on the service flow over time T, R represents the maximum sustained traffic rate for the service flow in bits per second, and B represents the maximum traffic burst for the service flow in bytes. If the CMTS ascertains that the bandwidth request is within throughput limits, the CMTS queues the details of the bandwidth request to an upstream scheduler, which determines when to grant the bandwidth request through use of one or more scheduling algorithms. Finally, the CMTS includes details regarding when the cable modem is able to transmit and for how long the cable modem is able to transmit in the next periodic bandwidth allocation MAP message.

As previously noted, the instructions for when a cable modem may make a transmission come from the CMTS in the form of a bandwidth allocation MAP message. The Cisco CMTS transmits a MAP message every 2 milliseconds to tell the cable modems when they may make a transmission of any kind. Each MAP message contains information that instructs modems exactly when to make a transmission, how long the transmission may last, and what type of data they may transmit.

While the above-described request-grant technique maximizes efficient use of available bandwidth, it also results in significant latency for the upstream data transmissions. In certain situations, such latency may result from the fact that the CMTS is geographically remotely located from the cable modems, such that the time that elapses from when a request message is sent to when a bandwidth allocation MAP message is received is not insignificant. Additionally, as noted above, there may also be restrictions on when request messages can be sent, meaning that there will typically be a delay between when a packet is ready to be sent and the time that the request message can be sent. This latency is especially problematic in the case of time-sensitive applications, such as video games and certain voice calls, for example.

Turning now to FIG. 1, illustrated therein is a simplified block diagram of a communication system 10 associated with a cable network infrastructure in accordance with one embodiment of the present disclosure for reducing data transmission latency in such systems. As shown in FIG. 1, the system 10 includes a network management system ("NMS") 12, a plurality of provisioning systems 14, and a CMTS 16, all of which may be suitably coupled to any type of network 17 (e.g., an Internet, an Intranet, a wireless network, a wide area network ("WAN"), a local area network ("LAN"), etc.). The system 10 of FIG. 1 may also include a cable network 18, which may be coupled to multiple cable modems 20a-20b. Each cable modem can be coupled to various instances of customer premise equipment ("CPE") 15a-15d, which in certain embodiments may be associated with Internet Protocol ("IP") version 4 ("IPv4") or version 6 ("IPv6").

In one example implementation, each of the cable modems 20a, 20b, can connect to the operator's cable network and to a home network, bridging packets between them. Many CPE devices, such as CPEs 15a-15d, can connect to LAN interfaces of the cable modems 20a, 20b. Additionally and/or alternatively, CPE devices can be embedded with the cable modem to form a single, unified device, or they can exist as separate, standalone devices. CPE devices may use IPv4, IPv6, both, or other forms of IP addressing. Examples of typical CPE devices include but are not limited to home routers, set-top devices, personal computers, etc. The CMTS 16 connects the operator's back office and core network with the cable network 18. The primary function of the CMTS 16 is to forward packets between these two domains, and between upstream and downstream channels on the cable network.

Provisioning system 14 may include various applications deployed in the back office network to provide configuration and other support to the devices on the cable network 18. These applications may use IPv4 and/or IPv6, as appropriate to the particular operator's deployment. The applications may include provisioning systems such as:

1) Dynamic Host Configuration Protocol ("DHCP") servers, which provide a cable modem with initial configuration information, including IP address(es), when the cable modem boots;
2) a Config File server, which is used to download configuration files to cable modems when they boot. Configuration files are in binary format and permit the configuration of the cable modems' parameters;
3) a Software Download server, which is used to download software upgrades to cable modems;
4) a Time Protocol server, which provides Time Protocol clients (typically cable modems) with the current time of day; and
5) a Certificate Revocation server, which provides certificate status.

NMS 12 may be implemented as a Simple Network Management Protocol ("SNMP") Manager that enables the cable network to configure and monitor SNMP agents (typically, the cable modems 20a, 20b, and the CMTS 16). NMS 12 may also include a Syslog server that collects messages pertaining to the operation of devices, such as CPE devices 15a-15d. In certain embodiments, DOCSIS is employed to enable transparent bi-directional transfer of IP traffic between a cable system head-end and customer locations, over the cable network 18, which may be implemented as an all-coaxial cable network or as an HFC cable network, for example.

In Remote-PHY ("R-PHY") architecture, the PHY is moved from the CMTS at the headend to the optical node, enabling a low cost digital connection between the optical node and CMTS core and a shorter (presumably better) link condition between the CMs and the R-PHY. As a result, an upstream ("US") scheduler, which is a part of layer 2 ("L2") software that remains in the CMTS core, may be geographically separate from PHY by thousands of miles in distance, resulting in a large latency between the scheduler and the PHY.

Figure 2:
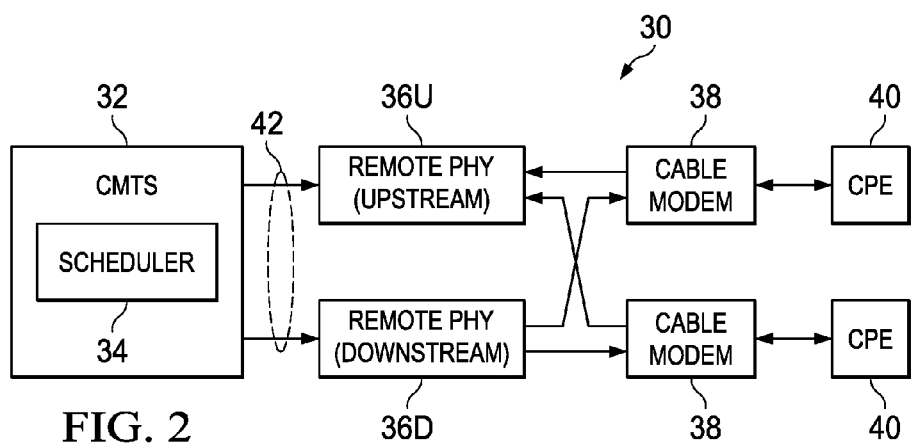
FIG. 2 is a more simplified block diagram of a communications network in which techniques for performing proactive upstream scheduling for flows in a point-to-multipoint communications network may be implemented.

FIG. 2 is a simplified block diagram of a communication system 30 associated with a cable network infrastructure in accordance with one embodiment of the present disclosure for reducing data transmission latency in such systems. As shown in FIG. 2, a system 30 includes a CMTS 32 including a scheduler 34 for scheduling allocation of upstream bandwidth in accordance with features that will be described herein below. The system 30 further includes an upstream R-PHY 36U and a downstream R-PHY 36D, as well as a plurality of cable modems 38 for providing CPE devices 40 access to a cable network. As illustrated in FIG. 2, R-PHY devices 36U and 36D are connected to CMTS 32 via a Converged Interconnect Network ("CIN") 42, which may be implemented as a layer 2 ("L2") or layer 3 ("L3") network.

In principle, the scheduler, such as the scheduler 34, may be viewed as a closed loop control system in N-dimensional space. The queue lengths of N cable modems are the objectives and the bandwidth ("BW") requests and grants are, respectively, feedback and control signals. It is well known that long latencies of feedback and control signals will deteriorate the performance of the closed loop control system. In the case of R-PHY, the long latency of bandwidth request/grant will deteriorate the performance of the scheduler.

Figure 3C:
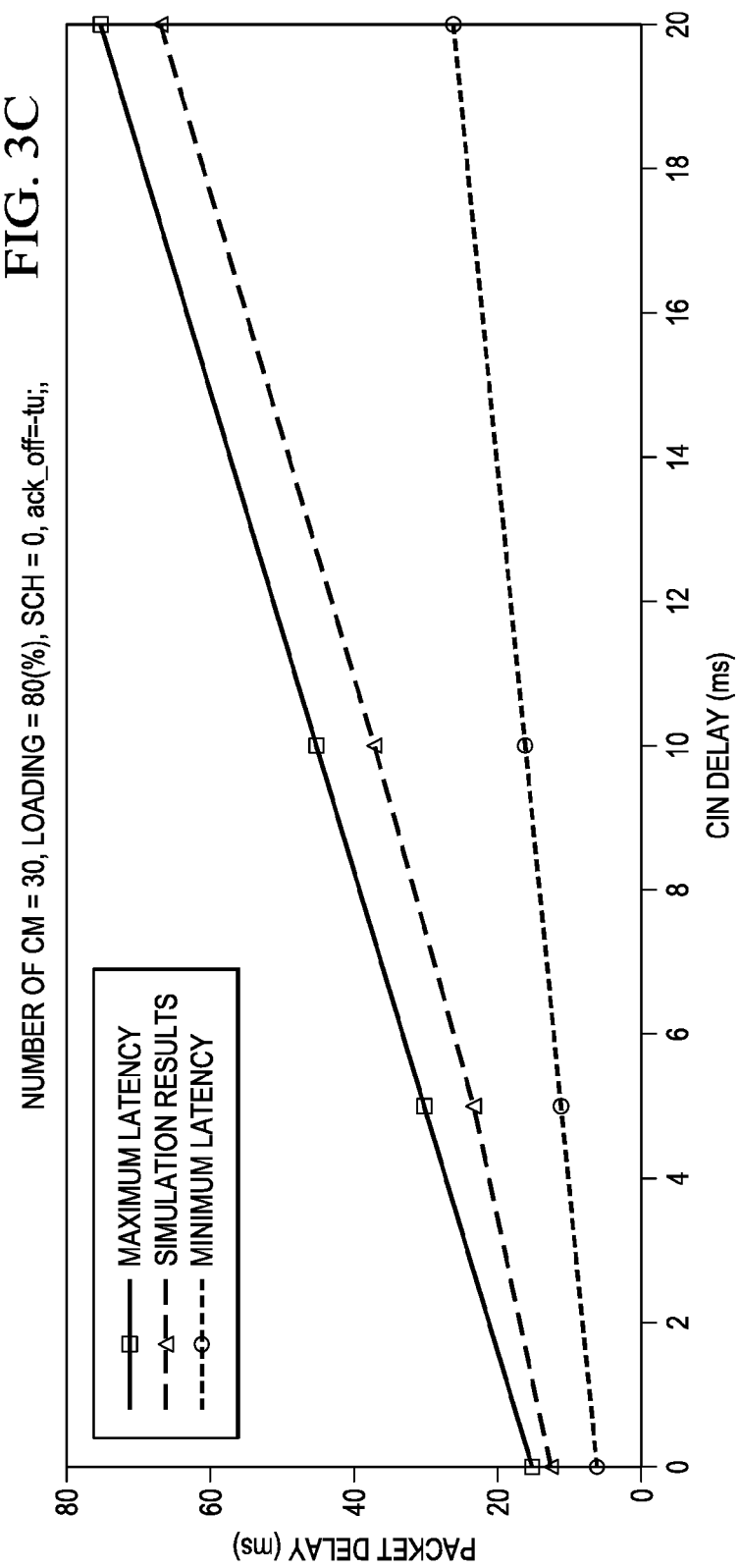
FIG. 3C illustrates results of simulations performed using a conventional request-grant scheduling algorithm.

MAP advance time, also known as MAP look ahead time, represents the difference between the time when the CMTS generates a MAP message and the time when the first transmission ordered by the MAP needs to be received by the CMTS. This time represents a combination of these delays present in a DOCSIS system. Ideally, as soon as a packet arrives, a cable modem receives an upstream grant with a proper size so that the cable modem can use the grant to transmit a packet immediately, resulting in a packet delay equal to the MAP advance time only. This may be referred to as "minimum delay," and is illustrated in FIG. 3A, in which $t_{M\_interval}$ is the map interval (e.g., 2 ms), $t_{M\_adv}$ is the MAP advance time, t' is the downstream or upstream delay (which are assumed to be symmetric), $\Delta t = t_{M\_adv} - t'$ and minimum upstream latency=$\Delta t + t' = t_{M\_adv}$ However, with a conventional request-grant scheduler, the packet may experience an additional delay of twice the Converged Interconnect Network ("CIN"), or 2*CIN, due to the propagation delays of the bandwidth request and the grant across the CIN. This may be referred to as "maximum delay" and is illustrated in FIG. 3B, in which $t_{M\_interval}$ is the map interval (e.g., 2 ms), $t_{M\_adv}$ is the MAP advance time, t' is the downstream or upstream delay (which are assumed to be symmetric), $\Delta t = t_{M\_adv} - t'$, and maximum upstream latency=$t' + 2*t_{M\_interv} + t' + \Delta t + t' = 2*t_{M\_interval} + t_{M\_adv} + 2t'$. In reality, the packet delay will vary and the average delay will be bounded between the minimum and maximum delays, as illustrated by the simulation results for a conventional request/grant scheduler, as illustrated in FIG. 3C.

As illustrated by the simulation results shown in FIG. 3C, the packet latency follows approximately 3 times CIN delay (specifically 2.7*CIN_delay) as follows:

Packet latency=2.7*CIN_delay+12

The fixed offset 12 ms is due to the DOCSIS inherent protocol (MAP advance time, MAP interval, etc.).

Figure 4A:
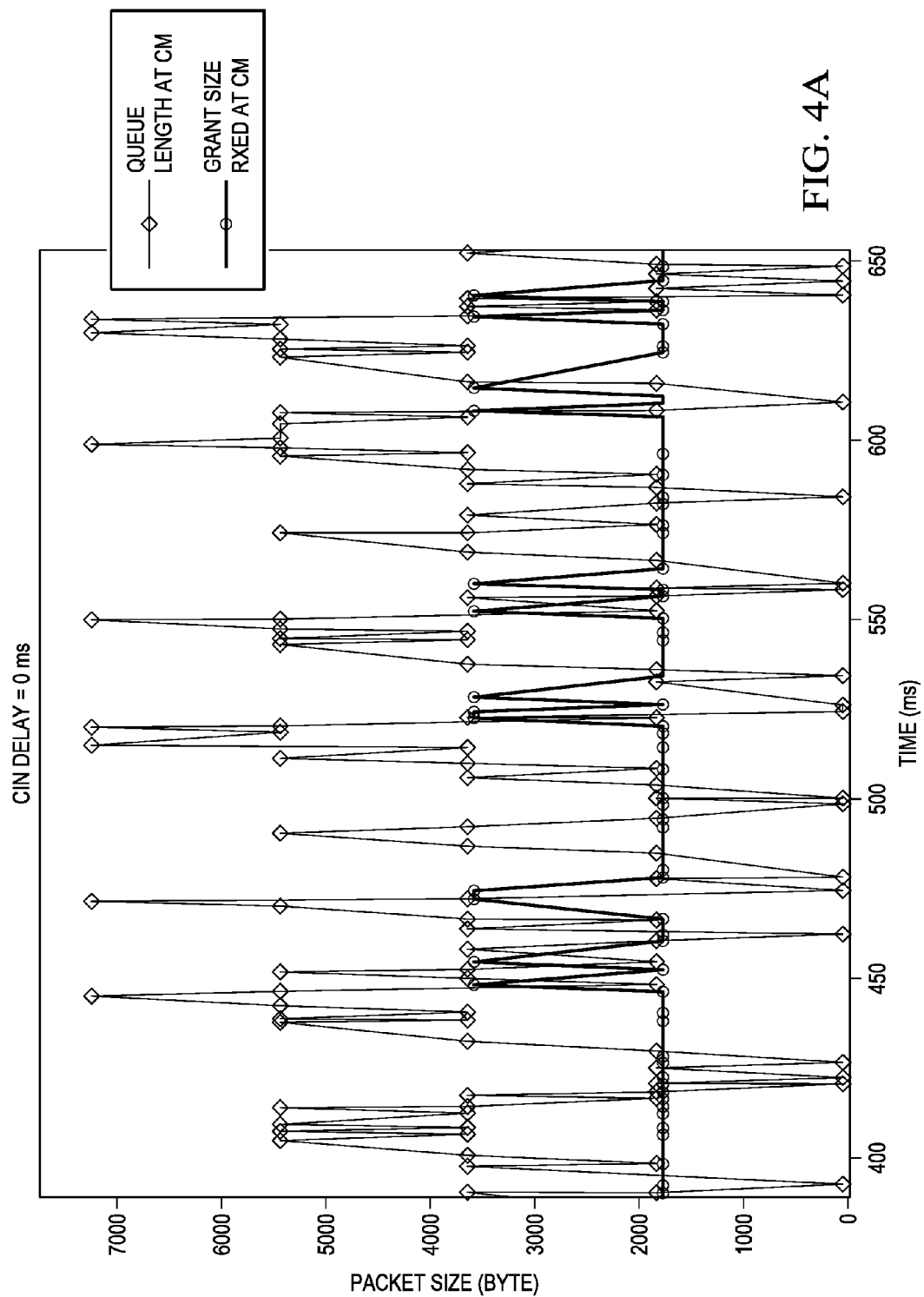
FIGS. 4A and 4B illustrate a correlation between queue depth and grant size at a cable modem based on Converged Interconnect Network ("CIN") delay.
Figure 4B:
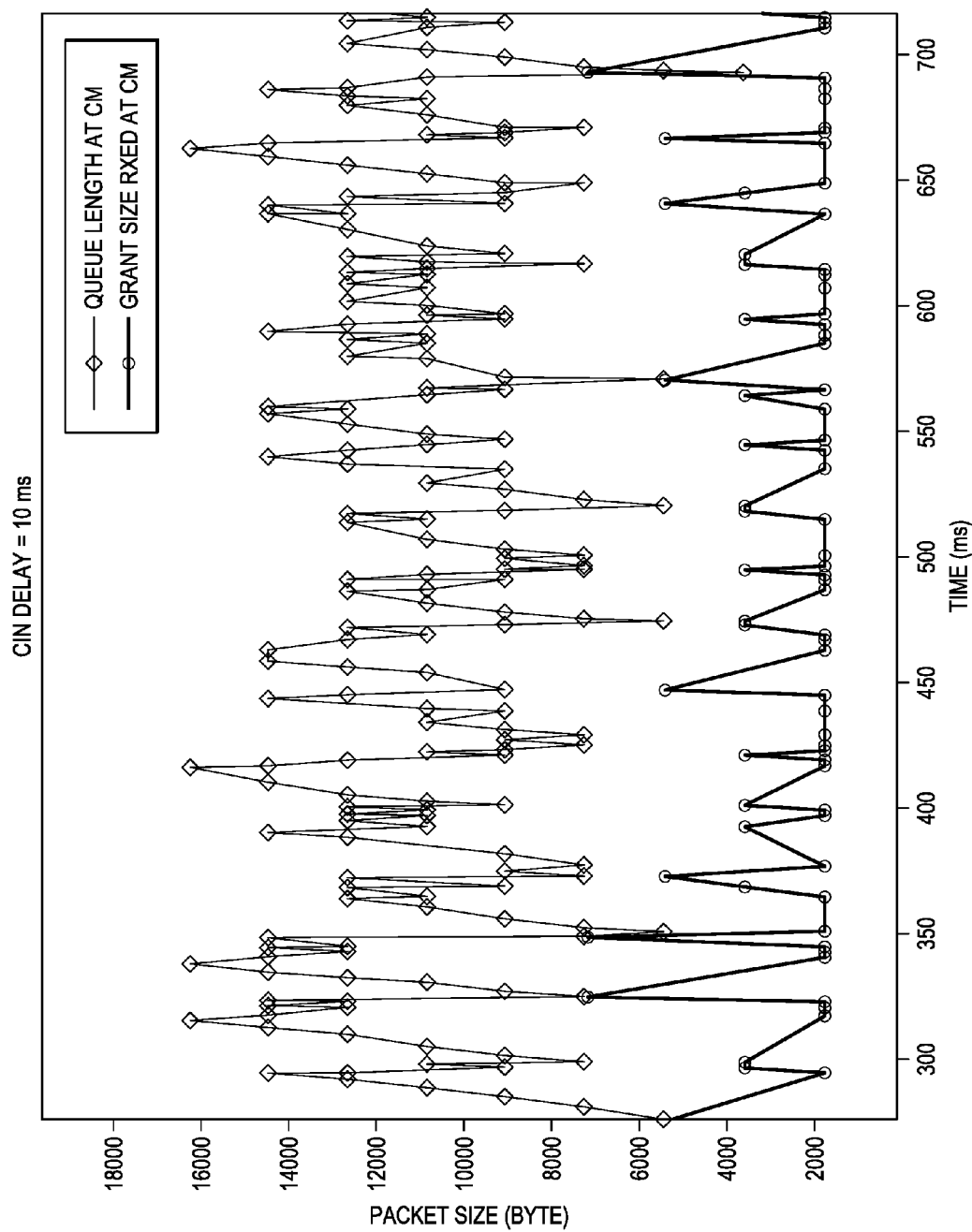

FIGS. 4A and 4B, respectively, illustrate the adverse effect of the latency of bandwidth requests and grants on scheduler performance. In particular, FIG. 4A illustrates a first case ("Case 1"), in which the CMTS core and the optical node are co-located (zero distance between the core and the node) and FIG. 4B illustrates a second case ("Case 2"), in which the CMTS core and the optical node are separated by 10 ms (5400 miles). The simulations used a conventional request-grant DOCSIS scheduler scheme with a map_adv_time=6 ms. Data arrived randomly at 30 cable modems from the network interface.

map_interval=2; MAP interval cm_t=1; CM processing time
cmts_t=1; CMTS processing time
ds_phy_t=2; DS PHY process time
us_phy_t=2; US PHY process time
hfc_t=1; HFC (coax) RTP delay
margin=1; margin for MAP advance time, default=1
  map_adv0=cm_t+cmts_t+ds_phy_t+hfc_t+margin;
  MAP advance time As illustrated in FIG. 4A, there is a high correlation between queue depth and the grant size received at cable modem (offset by 6 ms (MAP advance time), and the average queue depth is only approximately 3000 bytes.

As illustrated in FIG. 4B, with a 10 ms CIN delay, there is little correlation between the queue depth and the grant size received due to the latency of bandwidth request and grant. In other words, the grant size reflects the previous condition of the queue depth, which has changed significantly with the incoming data packets. The average queue depth is approximately 11000 bytes (approximately 4 times higher than the first case, illustrated in FIG. 4A). Larger queue depth means larger packet latency.

The extra CIN delay of the conventional request-grant scheduler degrades the scheduler performance and deteriorates user experience, particularly in cases in which the CMTS core is located thousands of miles away from the R-PHY device. The root cause of extra CIN delay latency is the request-grant delay. In accordance with features of embodiments described herein, to bypass this request-grant step, a request-grant pipeline is established. In other words, the grant used to send packets is originated from the previous packets. Pipeline request-grant is feasible, as the cable modem supports multiple requests and it is not necessary for the cable modem to send packets with the grant to the request that is originated directly from those packets. Packets can be sent out with any grants that may be originated directly from the packets or the previous packets in the queue.

In one embodiment, a request-grant pipeline may be established by issuing lots of unsolicited grants ("pre-granting"), but this creates a utilization problem, as unsolicited grants may not be used if there are no data in the queue, resulting in wasted capacity.

To use unsolicited grants to establish a request-grant pipeline and simultaneously maintain a good rate of utilization, the unsolicited grants must, in a static sense, match with the queue depths. In other words, the grants need to be correlated with the queue depth. In particular, as illustrated in FIGS. 4A and 4B, high correlation leads to low queue depth (and in turn, low latency), while low correlation leads to high queue depth (and in turn, high latency).

Figure 4C:
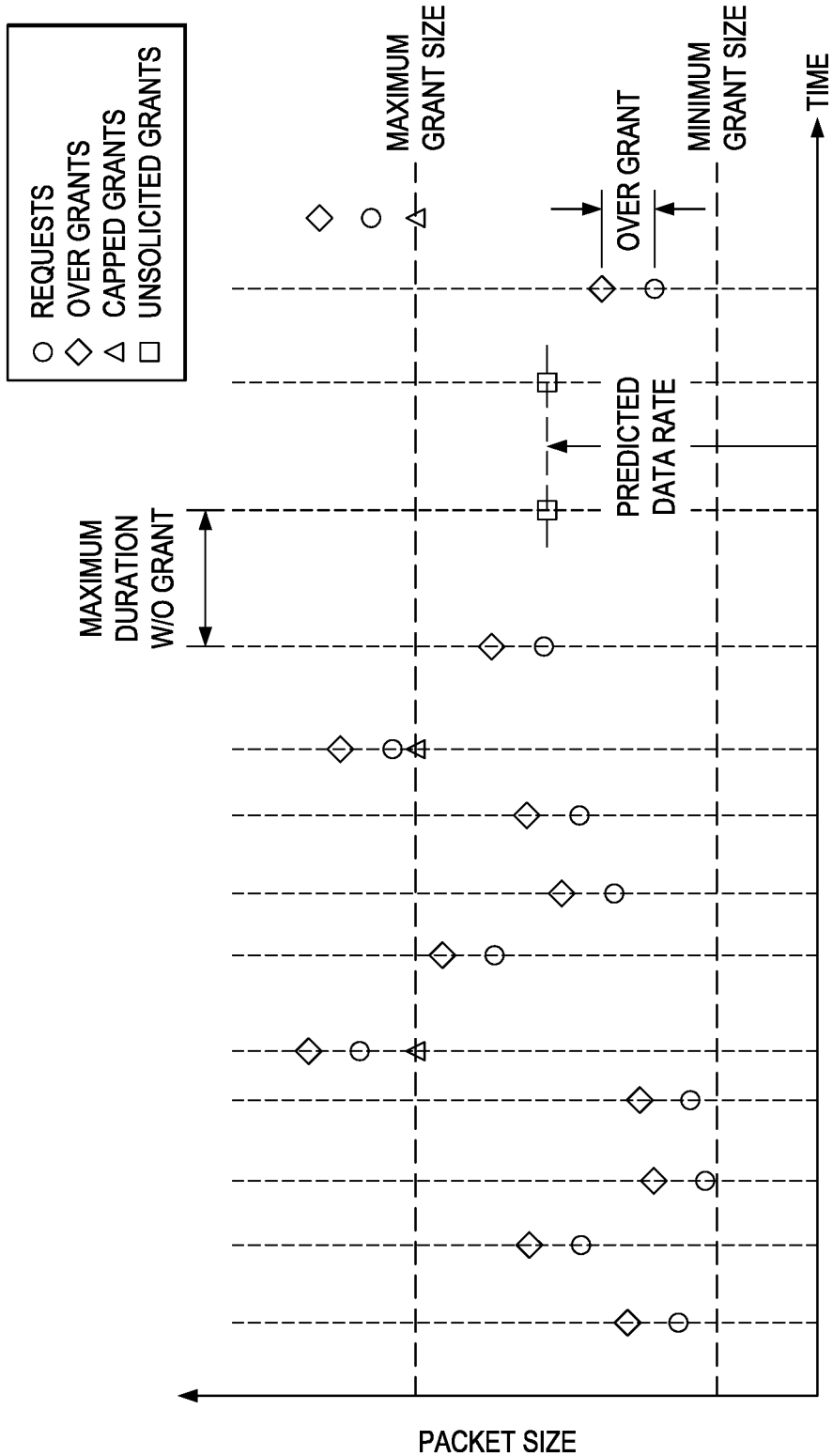
FIG. 4C is a graphical illustration of several concepts inherent in the techniques described herein for performing proactive upstream scheduling for flows in a point-to-multipoint communications network.

In accordance with embodiments described herein, a proactive scheduler establishes an effective request-grant pipeline that reduces packet latency while simultaneously maintaining high utilization. A primary aim of the proactive scheduler described herein is to optimize the correlation between grants (both solicited and unsolicited) and queue depths, thus reducing packet latency and maintaining high utilization. The proactive scheduler described herein performs several functions, including predicting the user average data rate based on queue depth growth rate, performing overgrants in which the actual grant size exceeds the requested grant size for each individual request, performing undergrants in which the maximum grant size of each individual grant is capped at a maximum, dynamically adjusting the range of the grant size (i.e., minimum and maximum grant sizes), issuing unsolicited grants if no requests are received within certain time periods for active users, in which the grant size of an unsolicited grant is equal to a predicted user average data rate. These concepts (i.e., overgrant, undergrant, maximum and minimum grant sizes, user average data rate, unsolicited grant, and maximum time duration without a grant) are illustrated in FIG. 4C.

Figure 5:
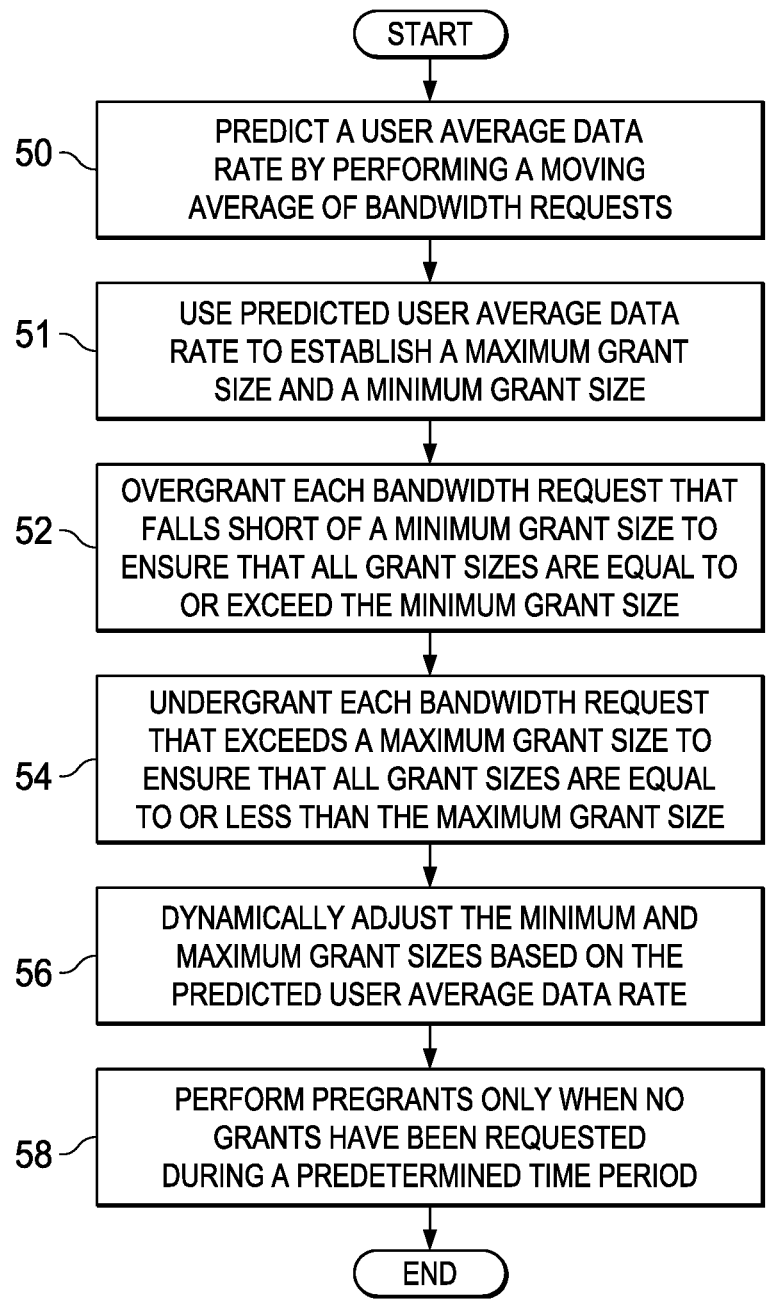
FIG. 5 is a flowchart illustrating a process that may be performed by a scheduler element of a communications network in which techniques for performing proactive upstream scheduling for flows in a point-to-multipoint communications network may be implemented.

Referring now to FIG. 5, illustrated therein is a flowchart of a process that may be performed by a scheduler element of a communications network in which techniques for performing proactive upstream scheduling for flows in a point-to-multipoint communications network may be implemented. It will be noted that the steps illustrated in FIG. 5 are performed by the scheduler element with respect to each cable modem. It will further be noted that for each cable modem, not all of the steps illustrated in FIG. 5 may be performed and/or the steps may be performed in a different order than that illustrated. As previously mentioned, a first step 50 in the illustrated process is to predict the user average data rate (i.e., the queue depth growth rate). The user average data rate can be estimated using a moving average of the request sizes. The moving average duration should be set in such a way that the estimated data rate can reflect the fluctuation of the actual data rate but smooth out any irregularities due to bandwidth competitions among multiple cable modems. In step 51, the user average data rate predicted in step 50 is used to establish a maximum grant size and a minimum grant size, which are used as described below. In step 52, overgranting may be performed. In particular, when a request is received, the scheduler should make a grant that exceeds the size of the request. The overgrant can be made in terms of either percentage, fixed bytes, or a number of bytes to make the size of the grant exceed the minimum grant size. In step 54, undergranting, in which the size of any individual grant is capped at a maximum, may be performed. In particular, after overgranting is performed, any grants with sizes exceeding the maximum grant size are capped at the maximum grant size.

Next, in step 56, minimum and maximum grant sizes are adjusted dynamically based on the estimated user average data rate. For example, the maximum grant size may be set to be 30% above the user rate, and minimum grant size may be set to 30% below the user average data rate. The user average data rate, minimum grant size, and maximum grant size need to be normalized with the grant interval. Finally, in step 60, if no grant requests are received during a pre-configured period of time, the scheduler may issue an unsolicited grant. The size of the unsolicited grant should be equal to the predicted user average data rate normalized by the time duration over which no request has been received.

The steps illustrated in and described with reference to FIG. 5 should not be performed in a way that contradict other requirements and/or constraints that are inherent to the DOCSIS protocol. For example, for each MAP interval, the total size of all the grants must be less than the CMTS upstream capacity. Additionally, if there is a capacity shortage, the grants should be first given to users with higher priorities based on CMTS QoS policy.

Figure 6A:
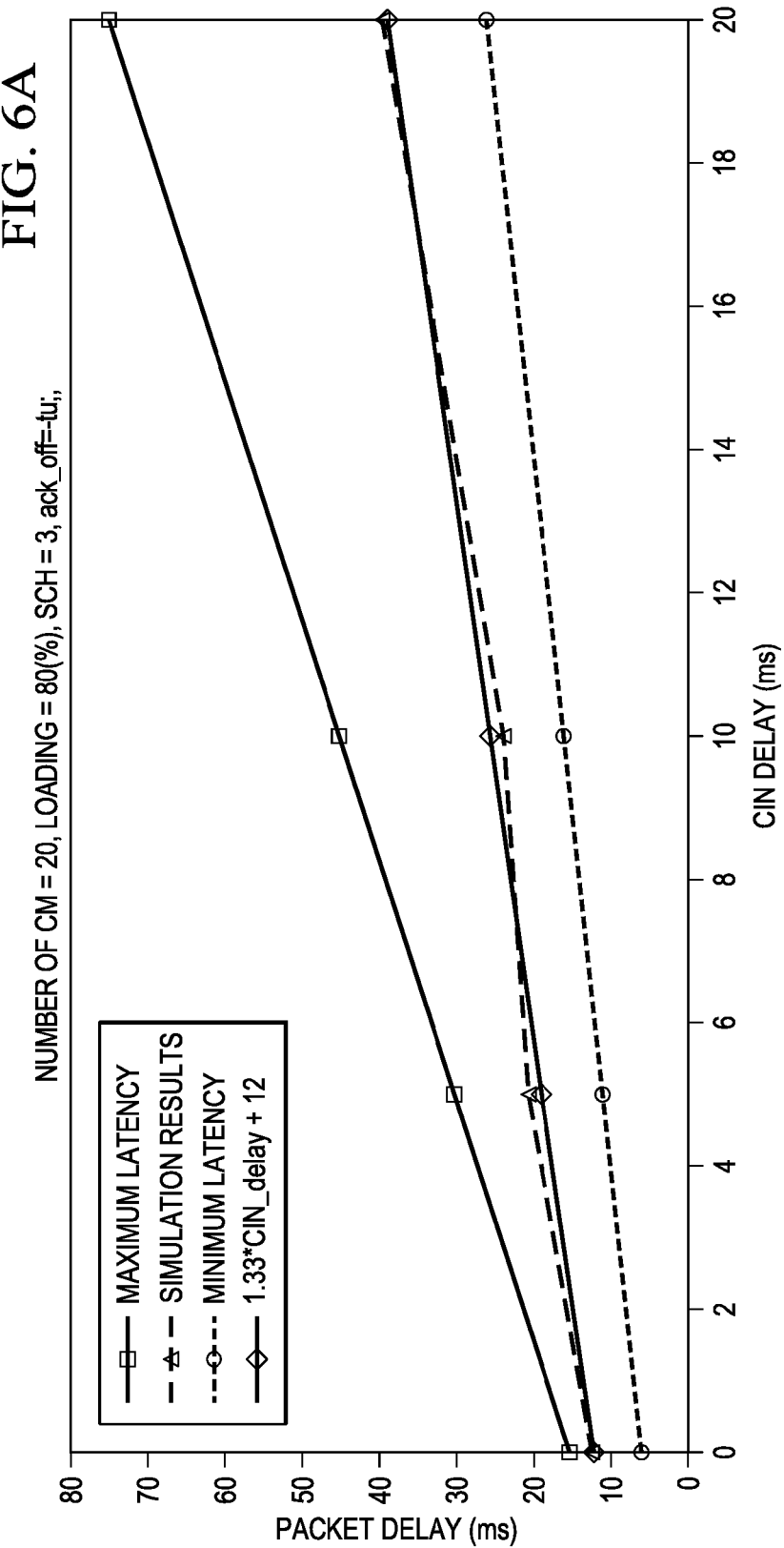
FIGS. 6A and 6B illustrate results of simulations conducted using techniques described herein for performing proactive upstream scheduling for flows in a point-to-multipoint communications network.

FIG. 6A illustrates results of a simulation using the proactive scheduling techniques in accordance with embodiments described herein. As illustrated in FIG. 6, using the following parameters:
  User average data rate=3.648 mbps
  Number of users=20
  QoS=round robin
  Moving average decay factor (for data rate prediction) =0.1
  Over grant=20%
  Max grant size (grant size cap)=18000 bytes Min grant size=1800 bytes Max no-grant interval=2 MAP interval (4 ms)

the proactive scheduler may achieve packet latency of $1.3*CIN\_delay$. The packet latency vs. CIN delay is approximated as follows:

$$\text{Packet latency} = 1.33*CIN\_delay + 12$$

The fixed offset of 12 ms is due to the DOCSIS inherent protocol (MAP advance time, MAP interval, etc.). Compared to the packet latency with a conventional request-grant scheduler ($2.7*CIN\_delay$), the proactive scheduler may reduce the packet latency by $1.4*CIN\_delay$. Better results may be achieved by fine tuning the configuration settings (e.g., maximum grant size, overgrant, max period w/o grant, user average data rate prediction).

Figure 6B:
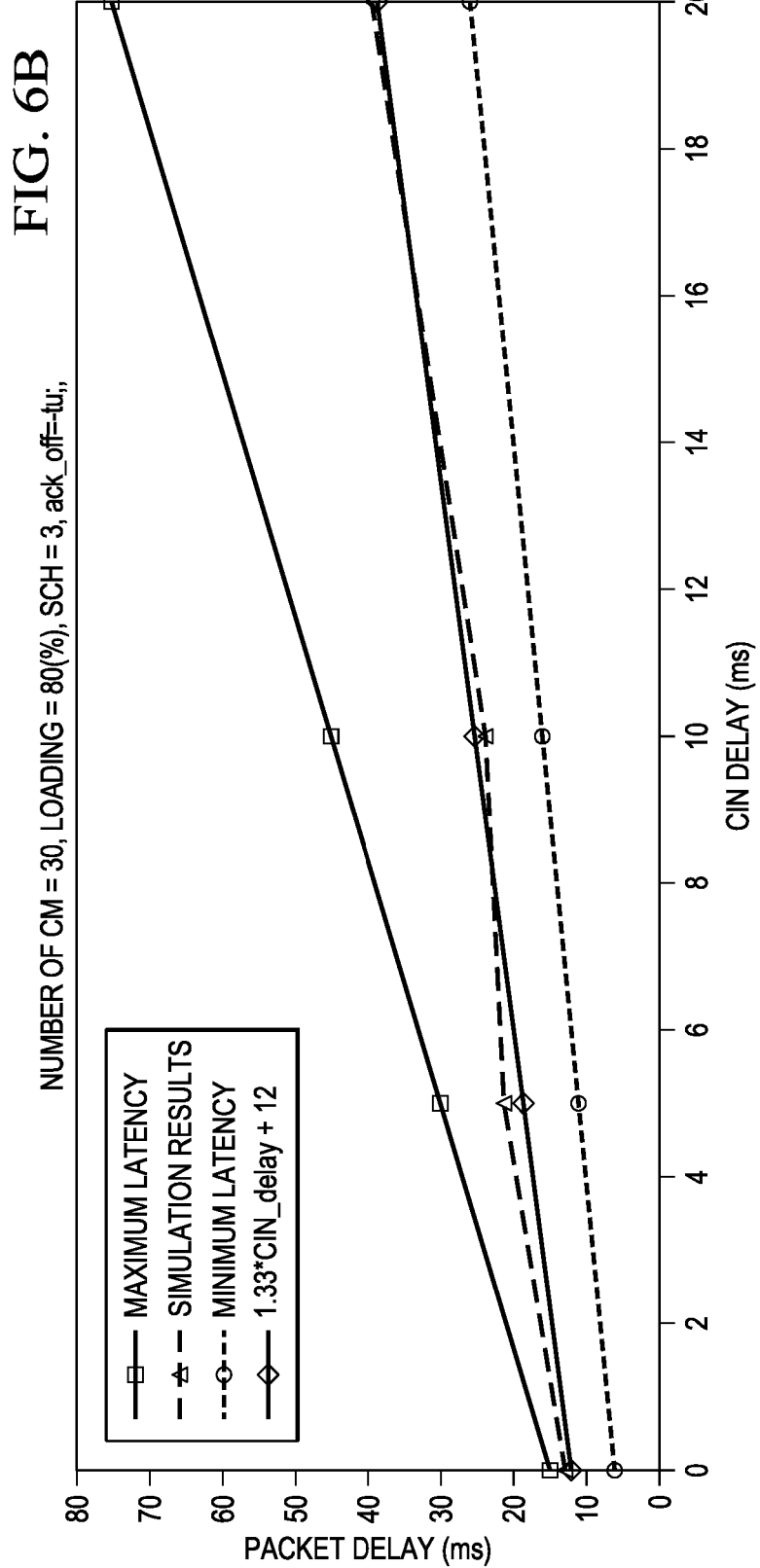

FIG. 6B illustrates results of a simulation using the same parameters as those used in the simulation of FIG. 6A except that the number of users is 30 instead of 20.

In example implementations, at least some portions of the activities related to the techniques described herein may be implemented in software in, for example, a server, a router, etc. In some embodiments, this software could be received or downloaded from a web server, provided on computer-readable media, or configured by a manufacturer of a particular element in order to provide this system in accordance with features of embodiments described herein. In some embodiments, one or more of these features may be implemented in hardware, provided external to these elements, or consolidated in any appropriate manner to achieve the intended functionality.

Figure 7:
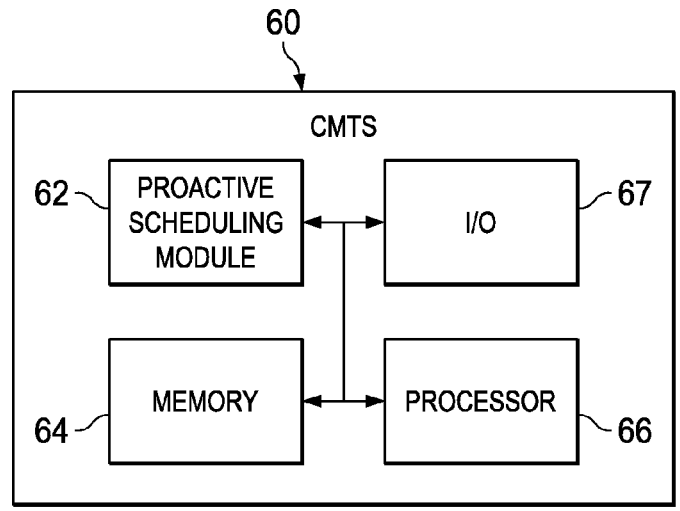
FIG. 7 is a simplified block diagram of a scheduler element of a communications network in which techniques for performing proactive upstream scheduling for flows in a point-to-multipoint communications network may be implemented.

For example, referring to FIG. 7, a CMTS 60 may include a proactive scheduling module 62, which comprises software embodied in one or more tangible media for facilitating the activities described herein. In particular, the scheduling module 62 comprises software for facilitating the processes illustrated in and described with reference to FIG. 5. The CMTS 60 may also include a memory device 64 for storing information to be used in achieving the functions as outlined herein. Additionally, the CMTS 60 may include a processor 66 that is capable of executing software or an algorithm (such as embodied in module 62) to perform the functions as discussed in this Specification. The CMTS 60 may also include various I/O 67 necessary for performing functions described herein.

Although the embodiments are described with reference to wireless communications network, it will be recognized that the techniques are equally applicable to other network technologies. In one example implementation, various devices involved in implementing the embodiments described herein can include software for achieving the described functions. For example, the nodes may be implemented using one or more computer devices comprising software embodied in one or more tangible media for facilitating the activities described herein. The computer device for implementing the transmitter and receiver elements may also include a memory device (or memory element) for storing information to be used in achieving the functions as outlined herein. Additionally, the computer device for implementing the transmitter and receiver elements may include a processor that is capable of executing software or an algorithm to perform the functions as discussed in this Specification, including but not limited to the functions illustrated in and described with reference to FIGS. 4-6. These devices may further keep information in any suitable memory element (random access memory ("RAM"), ROM, EPROM, EEPROM, ASIC, etc.), software, hardware, or in any other suitable component, device, element, or object where appropriate and based on particular needs. Any of the memory items discussed herein should be construed as being encompassed within the broad term "memory element." Similarly, any of the potential processing elements, modules, and machines described in this Specification should be construed as being encompassed within the broad term "processor." Each of the network elements can also include suitable interfaces for receiving, transmitting, and/or otherwise communicating data or information in a network environment.

Note that in certain example implementations, the functions outlined herein and specifically illustrated in FIG. 5 may be implemented by logic encoded in one or more tangible media (e.g., embedded logic provided in an application specific integrated circuit ("ASIC"), digital signal processor ("DSP") instructions, software (potentially inclusive of object code and source code) to be executed by a processor, or other similar machine, etc.). In some of these instances, a memory element can store data used for the operations described herein. This includes the memory element being able to store software, logic, code, or processor instructions that are executed to carry out the activities described in this Specification, including but not limited to the functions illustrated in and described with reference to FIGS. 4-6. A processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array ("FPGA"), an erasable programmable read only memory ("EPROM"), an electrically erasable programmable ROM ("EEPROM")) or an ASIC that includes digital logic, software, code, electronic instructions, or any suitable combination thereof.

It should be noted that much of the infrastructure discussed herein can be provisioned as part of any type of network element. As used herein, the term "network element" or "network device" can encompass computers, servers, network appliances, hosts, routers, switches, gateways, bridges, virtual equipment, load-balancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

In one implementation, network elements/devices can include software to achieve (or to foster) the management activities discussed herein. This could include the implementation of instances of any of the components, engines, logic, etc. shown in the FIGURES. Additionally, each of these devices can have an internal structure (e.g., a processor, a memory element, etc.) to facilitate some of the operations described herein. In other embodiments, these management activities may be executed externally to these devices, or included in some other network element to achieve the intended functionality. Alternatively, these network devices may include software (or reciprocating software) that can coordinate with other network elements in order to achieve the management activities described herein.

In still other embodiments, one or several devices may include any suitable algorithms, hardware, software, components, modules, interfaces, or objects that facilitate the operations thereof.

Figure 8:
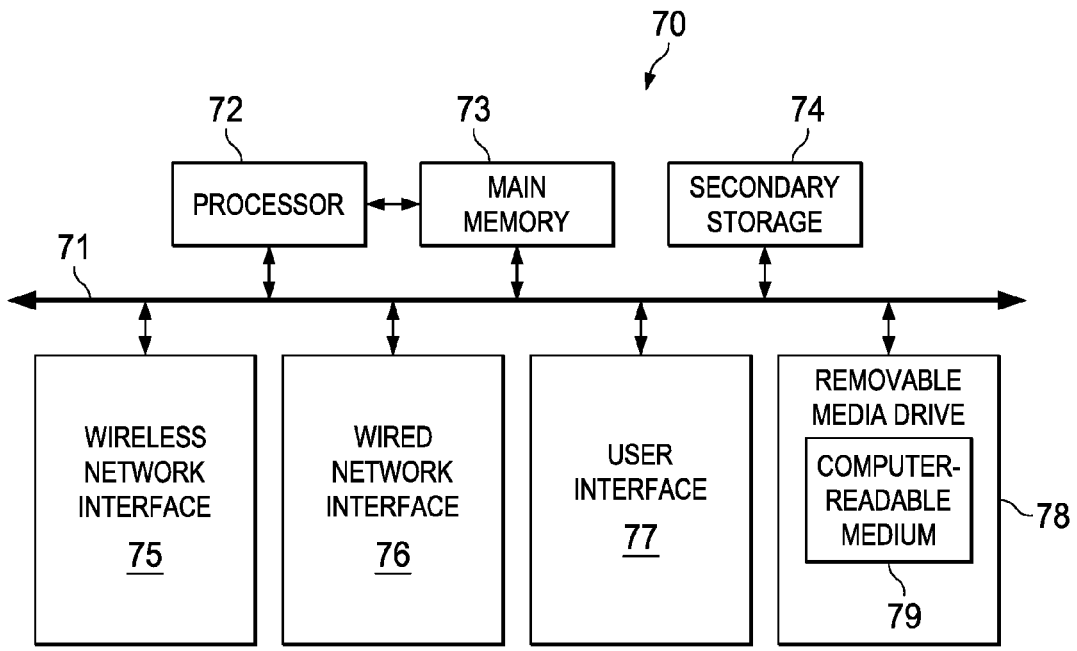
FIG. 8 is a simplified block diagram of a machine comprising an element of a communications network in which techniques for performing proactive upstream scheduling for flows in a point-to-multipoint communications network may be implemented.

Turning to FIG. 8, FIG. 8 illustrates a simplified block diagram of an example machine (or apparatus) 70, which in certain embodiments may be a CMTS and/or CMTS comprising elements of a communications system, such as communications system 10, in accordance with features of embodiments described herein. In particular, FIG. 8 illustrates a block diagram representation of an example form of a machine within which software and hardware cause machine 70 to perform any one or more of the activities or operations discussed herein. As shown in FIG. 8, machine 70 may include a processor 72, a main memory 73, secondary storage 74, a wireless network interface 75, a wired network interface 76, a user interface 77, and a removable media drive 78 including a computer-readable medium 79. A bus 71, such as a system bus and a memory bus, may provide electronic communication between processor 72 and the memory, drives, interfaces, and other components of machine 70.

Processor 72, which may also be referred to as a central processing unit ("CPU"), can include any general or special-purpose processor capable of executing machine readable instructions and performing operations on data as instructed by the machine readable instructions. Main memory 73 may be directly accessible to processor 72 for accessing machine instructions and may be in the form of random access memory ("RAM") or any type of dynamic storage (e.g., dynamic random access memory ("DRAM")). Secondary storage 74 can be any non-volatile memory such as a hard disk, which is capable of storing electronic data including executable software files. Externally stored electronic data may be provided to computer 70 through one or more removable media drives 78, which may be configured to receive any type of external media such as compact discs ("CDs"), digital video discs ("DVDs"), flash drives, external hard drives, etc.

Wireless and wired network interfaces 75 and 76 can be provided to enable electronic communication between machine 70 and other machines, or nodes. In one example, wireless network interface 75 could include a wireless network controller ("WNIC") with suitable transmitting and receiving components, such as transceivers, for wirelessly communicating within a network. Wired network interface 76 can enable machine 70 to physically connect to a network by a wire line such as an Ethernet cable. Both wireless and wired network interfaces 75 and 76 may be configured to facilitate communications using suitable communication protocols such as, for example, Internet Protocol Suite ("TCP/IP"). Machine 70 is shown with both wireless and wired network interfaces 75 and 76 for illustrative purposes only. While one or more wireless and hardwire interfaces may be provided in machine 70, or externally connected to machine 70, only one connection option is needed to enable connection of machine 70 to a network.

A user interface 77 may be provided in some machines to allow a user to interact with the machine 70. User interface 77 could include a display device such as a graphical display device (e.g., plasma display panel ("PDP"), a liquid crystal display ("LCD"), a cathode ray tube ("CRT"), etc.). In addition, any appropriate input mechanism may also be included such as a keyboard, a touch screen, a mouse, a trackball, voice recognition, touch pad, etc.

Removable media drive 78 represents a drive configured to receive any type of external computer-readable media (e.g., computer-readable medium 79). Instructions embodying the activities or functions described herein may be stored on one or more external computer-readable media. Additionally, such instructions may also, or alternatively, reside at least partially within a memory element (e.g., in main memory 73 or cache memory of processor 72) of machine 70 during execution, or within a non-volatile memory element (e.g., secondary storage 74) of machine 70. Accordingly, other memory elements of machine 70 also constitute computer-readable media. Thus, "computer-readable medium" is meant to include any medium that is capable of storing instructions for execution by machine 70 that cause the machine to perform any one or more of the activities disclosed herein.

Not shown in FIG. 8 is additional hardware that may be suitably coupled to processor 72 and other components in the form of memory management units ("MMU"), additional symmetric multiprocessing ("SMP") elements, physical memory, peripheral component interconnect ("PCI") bus and corresponding bridges, small computer system interface ("SCSI")/integrated drive electronics ("IDE") elements, etc. Machine 70 may include any additional suitable hardware, software, components, modules, interfaces, or objects that facilitate the operations thereof. This may be inclusive of appropriate algorithms and communication protocols that allow for the effective protection and communication of data. Furthermore, any suitable operating system may also be configured in machine 70 to appropriately manage the operation of the hardware components therein.

The elements, shown and/or described with reference to machine 70, are intended for illustrative purposes and are not meant to imply architectural limitations of machines such as those utilized in accordance with the present disclosure. In addition, each machine may include more or fewer components where appropriate and based on particular needs. As used herein in this Specification, the term "machine" is meant to encompass any computing device or network element such as servers, routers, personal computers, client computers, network appliances, switches, bridges, gateways, processors, load balancers, wireless LAN controllers, firewalls, or any other suitable device, component, element, or object operable to affect or process electronic information in a network environment.

In example implementations, at least some portions of the activities described herein related to techniques for enabling packet prioritization without starvation in data center networks may be implemented in software in, for example, hosts and storage devices. In some embodiments, this software could be received or downloaded from a web server, provided on computer-readable media, or configured by a manufacturer of a particular element in order to implement the embodiments described herein. In some embodiments, one or more of these features may be implemented in hardware, provided external to these elements, or consolidated in any appropriate manner to achieve the intended functionality.

In one example implementation, hosts and storage devices are network elements or computing devices, which may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information.

Furthermore, in the embodiments described and illustrated herein, some of the processors and memory elements associated with the various network elements may be removed, or otherwise consolidated such that a single processor and a single memory location are responsible for certain activities. Alternatively, certain processing functions could be separated and separate processors and/or physical machines could implement various functionalities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of the example embodiments, one or more memory elements (e.g., main memory 73, secondary storage 74, computer-readable medium 79) can store data used in implementing embodiments described and illustrated herein. This includes at least some of the memory elements being able to store instructions (e.g., software, logic, code, etc.) that are executed to carry out the activities described in this Specification. A processor can execute any type of instructions associated with the data to achieve the operations detailed herein in this Specification. In one example, one or more processors (e.g., processor 72) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array ("FPGA"), an erasable programmable read only memory ("EPROM"), an electrically erasable programmable read only memory ("EEPROM")), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

Components of the system 10, may keep information in any suitable type of memory (e.g., random access memory ("RAM"), read-only memory ("ROM"), erasable programmable ROM ("EPROM"), electrically erasable programmable ROM ("EEPROM"), etc.), software, hardware, or in any other suitable component, device, element, or object where appropriate and based on particular needs. Any of the memory items discussed herein should be construed as being encompassed within the broad term "memory element." The information being read, used, tracked, sent, transmitted, communicated, or received by system 10, could be provided in any database, register, queue, table, cache, control list, or other storage structure, all of which can be referenced at any suitable timeframe. Any such storage options may be included within the broad term "memory element" as used herein. Similarly, any of the potential processing elements and modules described in this Specification should be construed as being encompassed within the broad term "processor."

Note that with the example provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that topologies illustrated in and described with reference to the accompanying FIGURES (and their teachings) are readily scalable and can accommodate a large number of components, as well as more complicated/sophisticated arrangements and configurations. Accordingly, the examples provided should not limit the scope or inhibit the broad teachings of the illustrated topologies as potentially applied to a myriad of other architectures.

It is also important to note that the steps in the preceding flow diagrams illustrate only some of the possible signaling scenarios and patterns that may be executed by, or within, communication systems shown in the FIGURES. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication systems shown in the FIGURES in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular communication exchanges, embodiments described herein may be applicable to other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 142 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
   predicting a user average data rate for a cable modem;
   establishing a minimum bandwidth grant size and a maximum bandwidth grant size for the cable modem based on the predicted user average data rate;
   receiving from the cable modem a request for a particular amount of bandwidth;
   performing an overgrant if the particular amount of bandwidth is less than the minimum bandwidth grant size, wherein the overgrant comprises granting to the cable modem more than the requested particular amount of bandwidth;
   performing an undergrant if the particular amount of bandwidth is greater than the maximum bandwidth grant size, wherein the undergrant comprises granting to the cable modem less than the requested particular amount of bandwidth; and if a predetermined period of time passes without receipt of another bandwidth request from the cable modem, performing an unsolicited pre-grant with respect to the cable modem in which a predetermined amount of bandwidth is granted to the cable modem.

2. The method of claim 1 further comprising:
periodically re-predicting the user average data rate for the cable modem; and
updating the minimum bandwidth grant size and the maximum bandwidth grant size based on the re-predicted user average data rate.

3. The method of claim 1, wherein the predicted user average data rate comprises a moving average of bandwidth requests received from the cable modem.

4. The method of claim 1, wherein the establishing comprises:
setting the maximum bandwidth grant size to (100+X) % of the predicted user average data rate; and
setting the minimum bandwidth grant size to (100−X) % of the predicted user average data rate;
wherein X is an integer.

5. The method of claim 1, wherein an amount of the overgrant comprises at least one of a percentage increase in the particular amount of bandwidth, a fixed number of bytes, and a number of bytes that makes the particular amount of bandwidth equal to the maximum grant threshold.

6. The method of claim 1, wherein an amount of the undergrant comprises at least one of a percentage decrease in the particular amount of bandwidth, a fixed number of bytes, and a number of bytes that makes the particular amount of bandwidth equal to the minimum grant threshold.

7. One or more non-transitory tangible media that includes code for execution and when executed by a processor is operable to perform operations comprising:
predicting a user average data rate for a cable modem;
establishing a minimum bandwidth grant size and a maximum bandwidth grant size for the cable modem based on the predicted user average data rate;
receiving from the cable modem a request for a particular amount of bandwidth;
performing an overgrant if the particular amount of bandwidth is less than the minimum bandwidth grant size, wherein the overgrant comprises granting to the cable modem more than the requested particular amount of bandwidth;
performing an undergrant if the particular amount of bandwidth is greater than the maximum bandwidth grant size, wherein the undergrant comprises granting to the cable modem less than the requested particular amount of bandwidth; and
if a predetermined period of time passes without receipt of another bandwidth request from the cable modem, performing an unsolicited pre-grant with respect to the cable modem in which a predetermined amount of bandwidth is granted to the cable modem.

8. The media of claim 7, wherein the operations further comprise:
periodically re-predicting the user average data rate for the cable modem; and
updating the minimum bandwidth grant size and the maximum bandwidth grant size based on the re-predicted user average data rate.

9. The media of claim 7, wherein the predicted user average data rate comprises a moving average of bandwidth requests received from the cable modem.

10. The media of claim 7, wherein the establishing comprises:
setting the maximum bandwidth grant size to (100+X) % of the predicted user average data rate; and
setting the minimum bandwidth grant size to (100−X) % of the predicted user average data rate;
wherein X is an integer.

11. The media of claim 7, wherein an amount of the overgrant comprises at least one of a percentage increase in the particular amount of bandwidth, a fixed number of bytes, and a number of bytes that makes the particular amount of bandwidth equal to the maximum grant threshold.

12. The media of claim 7, wherein an amount of the undergrant comprises at least one of a percentage decrease in the particular amount of bandwidth, a fixed number of bytes, and a number of bytes that makes the particular amount of bandwidth equal to the minimum grant threshold.

13. An apparatus comprising:
a memory element configured to store data;
a processor operable to execute instructions associated with the data; and
a proactive scheduling module configured to:
predict a user average data rate for a cable modem;
establish a minimum bandwidth grant size and a maximum bandwidth grant size for the cable modem based on the predicted user average data rate;
receive from the cable modem a request for a particular amount of bandwidth;
perform an overgrant if the particular amount of bandwidth is less than the minimum bandwidth grant size, wherein the overgrant comprises granting to the cable modem more than the requested particular amount of bandwidth;
perform an undergrant if the particular amount of bandwidth is greater than the maximum bandwidth grant size, wherein the undergrant comprises granting to the cable modem less than the requested particular amount of bandwidth; and
if a predetermined period of time passes without receipt of another bandwidth request from the cable modem, perform an unsolicited pre-grant with respect to the cable modem in which a predetermined amount of bandwidth is granted to the cable modem.

14. The apparatus of claim 13, wherein the proactive scheduling module is further configured to:
periodically re-predict the user average data rate for the cable modem; and
update the minimum bandwidth grant size and the maximum bandwidth grant size based on the re-predicted user average data rate.

15. The apparatus of claim 13, wherein the predicted user average data rate comprises a moving average of bandwidth requests received from the cable modem.

16. The apparatus of claim 13, wherein the establishing comprises:
setting the maximum bandwidth grant size to (100+X) % of the predicted user average data rate; and
setting the minimum bandwidth grant size to (100−X) % of the predicted user average data rate;
wherein X is an integer.

17. The apparatus of claim 13, wherein an amount of the overgrant comprises at least one of a percentage increase in the particular amount of bandwidth, a fixed number of bytes, and a number of bytes that makes the particular amount of bandwidth equal to the maximum grant threshold; and wherein an amount of the undergrant comprises at least one of a percentage decrease in the particular amount of bandwidth, a fixed number of bytes, and a number of bytes that makes the particular amount of bandwidth equal to the minimum grant threshold.

* * * * *